United States Patent
Dienhart et al.

(10) Patent No.: US 6,751,983 B1
(45) Date of Patent: Jun. 22, 2004

(54) AIR CONDITIONING UNIT WITH AN INNER HEAT TRANSFER UNIT

(75) Inventors: Bernd Dienhart, Cologne (DE); Hans-Joachim Krauss, Stuttgart (DE); Hagen Mittelstrass, Bondorf (DE); Karl-Heinz Staffa, Stuttgart (DE); Christoph Walter, Stuttgart (DE); Bernd Kallfass, Weissach (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 10/088,480

(22) PCT Filed: Sep. 18, 2000

(86) PCT No.: PCT/EP00/09126

§ 371 (c)(1),
(2), (4) Date: Oct. 1, 2002

(87) PCT Pub. No.: WO01/22012

PCT Pub. Date: Mar. 29, 2001

(30) Foreign Application Priority Data

Sep. 20, 1999 (DE) .......................................... 199 44 950

(51) Int. Cl.⁷ ............................................... F25B 41/00
(52) U.S. Cl. .......................... 62/513; 165/163; 165/155; 165/156; 165/184
(58) Field of Search .......................... 62/503, 512, 513, 62/399; 165/163, 179, 184, 156, 153

(56) References Cited

U.S. PATENT DOCUMENTS

| | | | |
|---|---|---|---|
| 2,120,764 A | * | 6/1938 | Newton ........................... 62/83 |
| 2,797,554 A | * | 7/1957 | Donovan ....................... 62/509 |
| 2,885,868 A | | 5/1959 | Radcliff |
| 3,012,414 A | | 12/1961 | La Porte |

(List continued on next page.)

FOREIGN PATENT DOCUMENTS

| | | |
|---|---|---|
| DE | 1781037 | 1/1959 |
| DE | 1053538 | 9/1959 |
| DE | 1208314 | 1/1966 |
| DE | 2658086 | 9/1977 |
| DE | 7818067 | 10/1978 |
| DE | 3015905 | 11/1980 |
| DE | 8019202 | 1/1983 |
| DE | 268989 | 6/1989 |
| DE | 19624030 | 12/1997 |
| DE | 19635454 | 3/1998 |
| DE | 19808893 | 9/1999 |
| FR | 362995 | 7/1906 |
| JP | 2000111277 A | * 4/2000 |

*Primary Examiner*—William E. Tapolcai
*Assistant Examiner*—Mohammad M. Ali
(74) *Attorney, Agent, or Firm*—Foley & Lardner LLP (57) ABSTRACT

The invention relates to an air conditioning unit with a coolant circuit which consists of a compressor, an evaporator, a collector located at the low pressure side between the evaporator and the compressor and an inner heat transfer unit with a beat transfer channel located at the high pressure side and a low pressure side beat transfer channel. According to the invention, the inner heat transfer unit has an at least segmentally spiraling and/or spiral-shaped steps between the outer and inner pipe of a coaxial pipe system. Additionally or alternatively, the inner heat transfer unit contains a multiple channel line which surrounds the collector in a spiral fashion and/or in which a low pressure side pipe longitudinal channel has a first segment which exits into said collector housing and a second segment which exits out of the said collector housing in addition to a high-pressure side pipe longitudinal channel which traverses the collector housing or leads into a first segment in a high-pressure execution chamber of said collector housing and a second segment leads out of the said chamber. Said invention can be used as a $CO_2$-air conditioning unit in vehicles.

6 Claims, 5 Drawing Sheets

U.S. PATENT DOCUMENTS

| | | | |
|---|---|---|---|
| 3,283,524 A | | 11/1966 | Byron |
| 3,596,474 A | * | 8/1971 | Bloxham et al. ............... 62/93 |
| 3,858,407 A | * | 1/1975 | Schumacher ................. 62/217 |
| 3,887,004 A | * | 6/1975 | Beck .......................... 165/179 |
| 3,938,353 A | * | 2/1976 | Wrenn et al. ................ 62/503 |
| 3,976,129 A | * | 8/1976 | Silver ......................... 165/154 |
| 4,208,887 A | * | 6/1980 | Morse et al. ................. 62/503 |
| 4,217,765 A | * | 8/1980 | Ecker .......................... 62/503 |
| 4,295,255 A | | 10/1981 | Weber |
| 4,380,912 A | * | 4/1983 | Edwards ...................... 62/506 |
| 4,417,453 A | | 11/1983 | Sasaki |
| 4,488,413 A | * | 12/1984 | Bottum ........................ 62/503 |
| 4,936,113 A | * | 6/1990 | Nivens ......................... 62/513 |
| 5,004,046 A | * | 4/1991 | Jones .......................... 165/156 |
| 5,075,967 A | * | 12/1991 | Bottum .................... 29/890.06 |
| 5,233,842 A | * | 8/1993 | Manning et al. .............. 62/132 |
| 5,433,252 A | * | 7/1995 | Wolf et al. .................. 138/113 |
| 5,479,790 A | * | 1/1996 | Bottum et al. ............... 62/503 |
| 5,816,314 A | * | 10/1998 | Wiggs et al. ................. 165/45 |
| 6,032,482 A | | 3/2000 | Krauss |

* cited by examiner

AIR CONDITIONING UNIT WITH AN INNER HEAT TRANSFER UNIT

The invention relates to an air-conditioning system with a refrigerant circuit which comprises an evaporator, a compressor conveying the refrigerant from a low-pressure side to a high-pressure side, a header arranged on the low-pressure side between the evaporator and the compressor and an internal heat exchanger which has a high-pressure-side heat exchanger duct and a low-pressure-side heat exchanger duct which is in thermal contact with the latter.

Air-conditioning systems of this type are used, in particular, in motor vehicles, for example in the form of $CO_2$ air-conditioning systems. The internal heat exchanger serves for transmitting heat from the refrigerant on the high-pressure side to the refrigerant on the low pressure side, with the result that what is known as the performance number, that is to say the ratio of the refrigerating capacity and the drive power of the air-conditioning system, can be markedly increased.

An air-conditioning system of this type is disclosed in the publicly distributed publication DE 196 35 454 A1. There, the internal heat exchanger is integrated, together with the header, into a structural unit by being accommodated in the interior of a header housing, for example in the form of a flat-tube spiral with turns spaced from one another.

It is known, furthermore, to use as an internal heat exchanger for an air-conditioning system a coaxial tube conduit with two fluid-separated tube longitudinal ducts which are in thermal contact with one another, in order to subcool the high-pressure-side refrigerant upstream of an expansion valve by the transmission of heat to the low-pressure-side refrigerant. The laid-open publication DE 1 208 314 describes a coaxial tube conduit which serves this purpose and in which an inner tube is surrounded concentrically by an outer tube and is provided on the inside with a longitudinal ribbing increasing the heat transmission surface. A wire screw may be introduced between the outer tube and the inner tube in order to lengthen the flow path effective for heat transmission. Inner-tube configurations are also indicated there as known, in which the inner tube is folded in a star-shaped manner or in which a sheet-metal helix for generating a swirl flow is inserted into the inner tube.

An air-conditioning system for a motor vehicle is also known, in which an internal heat exchanger is combined with an evaporator and with an expansion valve to form an integral structural unit. However, such a combination of the internal heat exchanger combining the internal heat exchanger in this way onto or into the evaporator often entails a relatively high construction space requirement, which, particularly under the confined conditions of installation of motor vehicles, may lead to difficulties.

In the older German patent application No. 199 03 833.3 which has not already been published, an integrated header/heat-exchanger structural unit is disclosed, in which the internal heat exchanger is formed by a coiled coaxial tube conduit which is received in the header housing.

The technical problem on which the invention is based is to provide an air-conditioning system of the type initially mentioned, with an internal heat exchanger which can be manufactured relatively simply and, for a given heat transmission capacity, requires relatively little additional construction space.

The invention solves this problem by the provision of an air-conditioning system having the features of claim 1, 3 or 4.

According to one embodiment of the present invention, an air-conditioning system is provided with an internal heat exchanger that contains, in particular, a coaxial tube conduit which has helical webs between an outer tube and an inner tube and/or which is coiled overall at least in portions. The helical webs are integrally formed on the outer tube and/or the inner tube and can therefore be implemented relatively simply in production terms. By virtue of their helical shape, for a given construction length of the coaxial tube conduit, they lengthen the flow path for the refrigerant, for example the low-pressure-side refrigerant, which flows through between the outer tube and the inner tube and which is in thermal contact with the refrigerant, for example the high-pressure-side refrigerant, led through the inner tube. Additionally or alternatively to this measure, the coaxial tube conduit may have a coiled design, with the result that the construction space length required can be kept markedly smaller than the flow path length effective for heat transmission. At the same time, the low-pressure-side heat exchanger duct forms a refrigerant circuit portion between the evaporator and the header and/or between the header and the compressor.

According to another embodiment of the present invention, the coaxial tube conduit is formed by an extruded inner tube with outer webs, which is pushed into an outer tube, or by an extruded outer tube with inner webs, into which the inner tube is pushed, or by a tube extruded in one piece and having integrated webs between the inner and the outer tube.

According to another embodiment of the present invention, the extent of the internal heat exchanger formed by a multiduct tube conduit extends, on the low-pressure side, on both sides of the header, for which purpose the low-pressure-side tube longitudinal duct has a portion issuing into a housing of the header and a portion issuing out of said housing, while the high-pressure-side tube longitudinal duct crosses the header housing as a continuous duct or issues with a first portion into a high-pressure leadthrough space formed within the header housing and issues with a second portion out of said high-pressure leadthrough space. Depending on the configuration within the header housing, there, the issuing-in and/or issuing-out low-pressure-side tube longitudinal duct is in thermal contact with the high-pressure-side tube longitudinal duct or the high-pressure leadthrough space, so that the internal heat exchanger consequently also extends at least partially within the header housing.

According to another embodiment of the present invention, the internal heat exchanger contains a coiled multiduct tube conduit which surrounds the header. In other words, in this case, the header is accommodated in the tube helix of the internal heat exchanger, thus keeping the construction space requirement of the air-conditioning system low.

According to another embodiment of the present invention, the outside of the header is provided with a screw-shaped profile corresponding to the surround multiduct tube conduit helix, so that the latter comes to bear with a form fit against the outside of the header in a guided manner.

BRIEF DESCRIPTION OF THE DRAWINGS

Advantageous embodiments of the invention are illustrated in the drawings and are described below. In the drawings:

FIG. 11 shows a longitudinal sectional view of a header region of the refrigerant circuit of FIG. 1 with a led-through high-pressure conduit.

DETAILED DESCRIPTION OF THE PREFERRED EMBODIMENTS

Figures 1, 2:
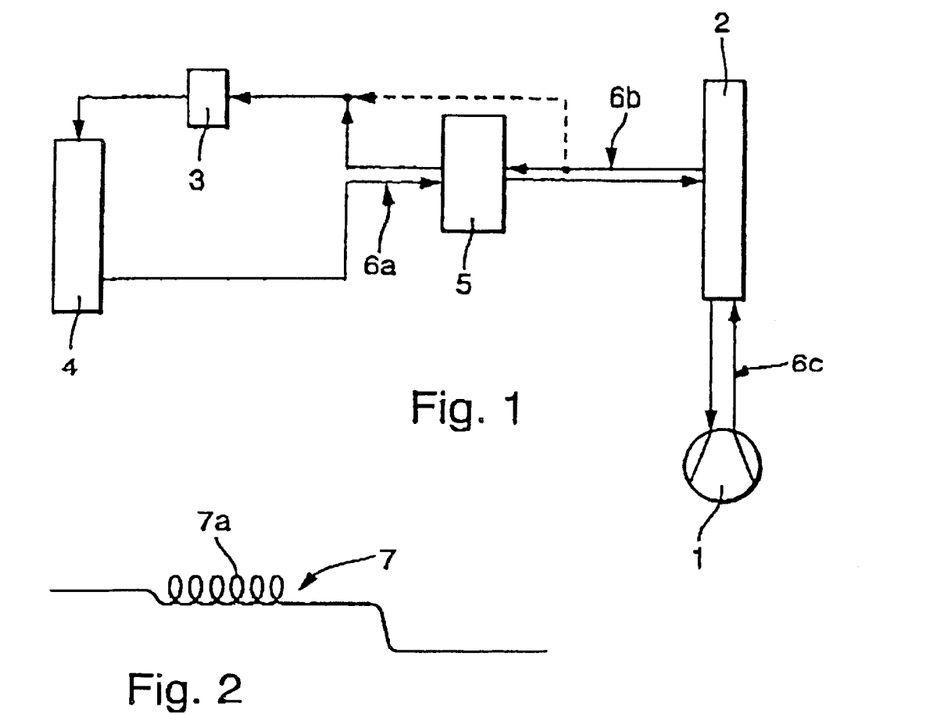
FIG. 1 shows a block diagram of an air-conditioning system having a refrigerant circuit with an internal heat exchanger in the form of a multiduct tube conduit.
FIGS. 2 to 5 show diagrammatic illustrations of possible helical shapes for the multiduct tube conduit of the air-conditioning system of FIG. 1, FIGS. 6 to 10 show cross sections of various embodiments of the multiduct tube conduit as a coaxial tube conduit.

FIG. 1 shows diagrammatically, as a block diagram, the set-up of an air-conditioning system, such as can be used, for example, in a motor vehicle. In the associated refrigerant circuit are located, as is customary, a compressor 1, a condenser 2 which follows the latter on the high-pressure side and, for example when $CO_2$ is used as refrigerant, is generally designated more precisely as a gas cooler, an expansion valve 3 located downstream of said condenser, an evaporator 4 following said expansion valve in the refrigerant flow direction and a header 5 arranged on the low-pressure side between the evaporator 4 and the compressor 1. Insofar as the high-pressure-side refrigerant conduit and the low-pressure-side refrigerant conduit are reproduced in FIG. 1 by closely adjacent lines, one or more of these circuit portions may, depending on the application, be implemented by a multiduct tube conduit forming an internal heat exchanger.

The internal heat exchanger consequently contains a first portion 6a, which forms on the low-pressure side at least part of the refrigerant conduit from the evaporator 4 to the header 5, and/or a second portion 6b, which forms on the low-pressure side at least part of the refrigerant conduit from the header 5 to the compressor 1 and on the high-pressure side, like the first portion 6a, at least part of the refrigerant conduit from the condenser/gas cooler 2 to the expansion valve 3, and/or a third portion 6c, which forms on the high-pressure side at least part of the refrigerant conduit from the compressor 1 to the condenser/gas cooler 2 and on the low-pressure side, like the second portion 6b, at least part of the refrigerant conduit from the header 5 to the compressor 1. In a variant indicated by broken lines, the high-pressure-side refrigerant conduit bypasses the header 5 and leads, without renewed thermal conduct with the low-pressure side, to the expansion valve 3, that is to say, in this case, the first portion 6a of the internal head exchanger is dispensed with. In a similar way, another of the three internal heat exchanger portions 6a, 6b, 6c or two of them may be dispensed with.

Figure 3:
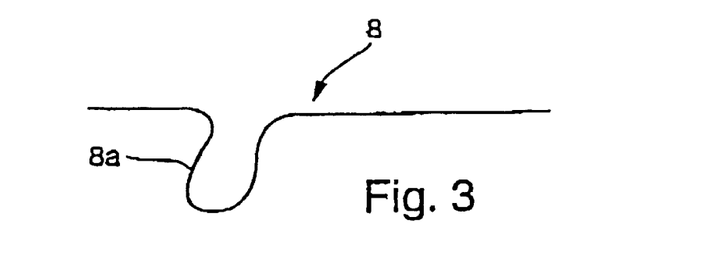
Figure 4:
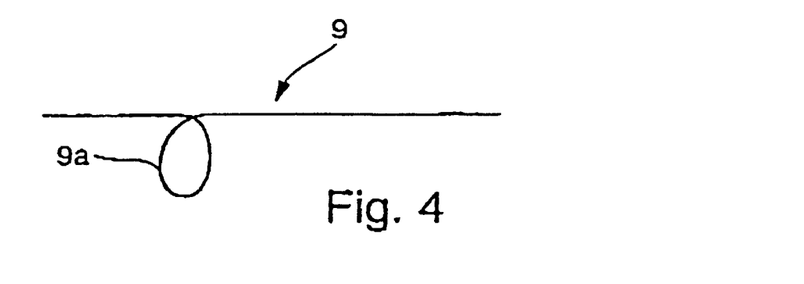
Figure 5:
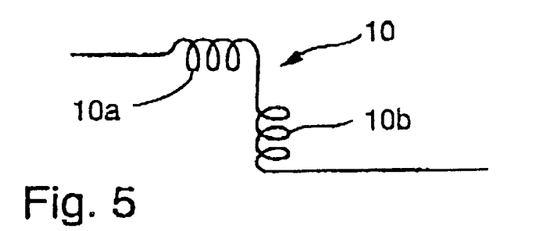

FIGS. 2 to 5 outline some possible helical embodiments of the multiduct tube conduit which are capable of being used to form the internal heat exchanger portions 6a, 6b, 6c so as to save construction space. In particular, FIG. 2 shows a multiduct tube conduit 7 which is wound in a corresponding portion to form a helix 7a with a rectilinear helix longitudinal axis. FIG. 3 shows a multiduct tube conduit 8 which has a portion bent into a U-bend 8a. FIG. 4 shows a multiduct tube conduit 9 with a portion 9a coiled to form a loop. FIG. 5 shows a multiduct tube conduit 10 with two helical portions 10a, 10b with helix longitudinal axes perpendicular to one another.

Figure 6:
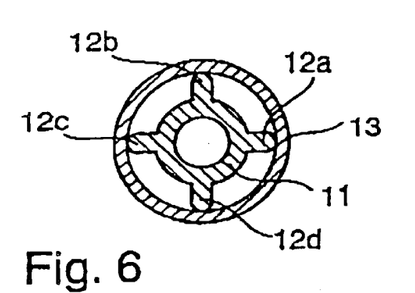
Figure 7:
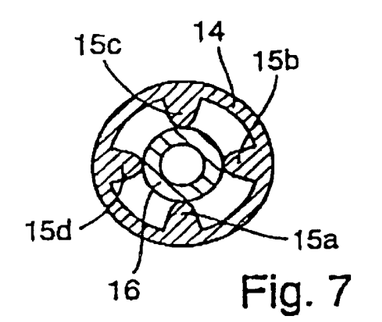
Figure 8:
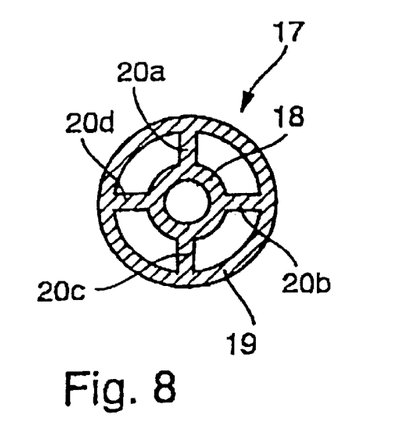

FIGS. 6 to 10 show cross-sectional views of various embodiments of the multiduct tube conduit forming the internal heat exchanger, as a coaxial tube conduit. In particular, FIG. 6 illustrates an internal heat exchanger in the form of a coaxial tube which consists of an extruded inner tube 11 with four helically running longitudinal webs 12a, 12b, 12c, 12d integrally formed on the outside at an equidistant angular interval, said inner tube being pushed into an associated outer tube 13. In the exemplary embodiment of FIG. 7, the coaxial tube conduit for the internal heat exchanger consists of an extruded outer tube 14, on the inside of which four helically running longitudinal webs 15a to 15d arranged at an equidistant angular interval are integrally formed and into which an associated inner tube 16 is pushed. FIG. 8 shows a coaxial tube 17 which can be used as an internal heat exchanger and is manufactured, extruded, as a one-piece component, an inner tube part 18 and an outer tube part 19 being connected to one another via four longitudinal webs 20a to 20d arranged at an equidistant angular interval and running helically in the tube longitudinal direction. In all three examples of FIGS. 6 to 8, the helical run of the longitudinal webs may be brought about, during the extrusion manufacturing operation, by appropriate twisting about the longitudinal axis of the inner tube 11 as regards FIG. 6, of the outer tube 14 as regards FIG. 7 or of the entire coaxial tube 17 as regards FIG. 8, and the helix pitch can be set variably in a desired way. By the choice of the equidistant angular intervals of the webs, the annular space between the outer and the inner tube part is divided into individual ducts with an equal flow cross section.

Figure 9:
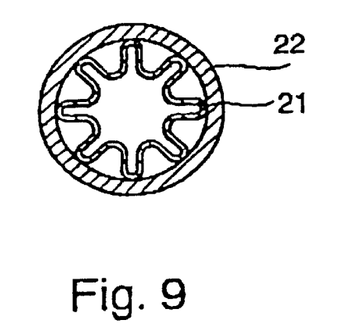

FIG. 9 shows a coaxial tube configuration for the internal heat exchanger, in which an inner tube 21 having a rounded star-shaped tube wall cross section is pushed into an outer tube 22. In the exemplary embodiment of FIG. 10, the coaxial tube conduit for the internal heat exchanger consists of an inner tube 23, an outer tube 24 and a corrugated rib profile 25 inserted between the inner tube 23 and the outer tube 24.

In all the examples of FIGS. 6 to 10, the respective coaxial tube conduit contains a one-part inner tube longitudinal duct formed by the surrounding inner tube and a multipart outer tube longitudinal duct which is formed by the interspace between the inner tube and the outer tube and which is divided into a plurality of parallel outer longitudinal ducts by the webs or the inner tube wall profile or the corrugated rib profile. A helical run of the separating elements between the individual outer longitudinal ducts lengthens the flow path for the refrigerant led through there, as compared with the tube length, and thereby intensifies thermal contact between this refrigerant stream and the refrigerant stream led through the inner tube. In addition, as explained above with regard to FIGS. 2 to 5, the coaxial tube conduit may be coiled as a whole partially or completely, so that its constructional length can be shortened and it can thereby be introduced more easily in confined construction spaces. Consequently, by the internal heat exchanger being implemented as a multiduct tube conduit, only a single multiduct tube needs to be bent in order to achieve a correspondingly bent space-saving flow routing both for the high-pressure-side and for the low-pressure-side heat exchanger duct of the internal heat exchanger.

It goes without saying that, in addition to the embodiments shown in FIGS. 6 to 10, further multiduct tube configurations are possible, for example those in which there are in each case for the high-pressure-side and the low-pressure-side refrigerant a plurality of individual tube ducts which, moreover, do not necessarily have to be coaxial, but, for example, may also be arranged alternately next to one another. Alternatively, instead of the high-pressure-side and low-pressure-side refrigerant being routed into the internal heat exchanger portions 6a, 6b, 6c as indicated by arrows in FIG. 1, the routing of said refrigerant may be provided in cocurrent for all or only some of the internal heat exchanger portions 6a, 6b, 6c. Where the coaxial tube conduit is concerned, the high-pressure-side refrigerant is preferably routed in the inner tube, while the low-pressure-side refrigerant is routed in the annular space between the inner and the outer tube, but, alternatively, the routing of the high-pressure-side refrigerant in the outer annular space and the routing of the low-pressure-side refrigerant in the inner tube are also possible.

Figures 10, 11:
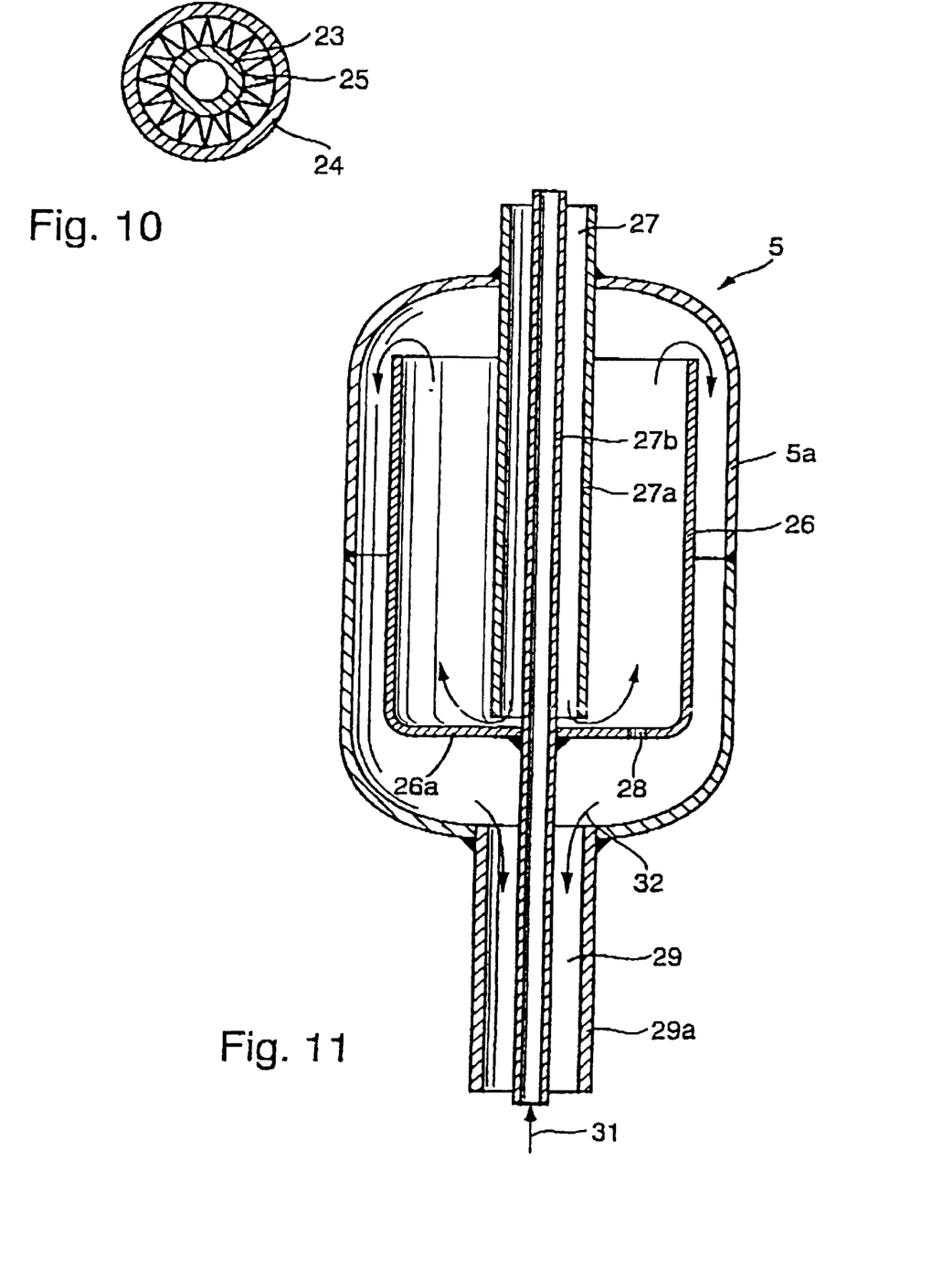

FIG. 11 shows an exemplary embodiment in which the header 5 is followed on each of the two sides by a portion of the internal heat exchanger in the coaxial tube form of construction and, at the same time, a high-pressure-side conduit crosses a header housing 5a closing off the header 5 outwardly. For this purpose, the header housing 5a has located in it a header bowl 26, into which a first coaxial tube conduit 27 led through the header housing 5a from above leads and terminates with its outer tube 27a at a short distance above the bowl bottom 26a, into which one or more oil suction-extraction bores 28 are introduced. By contrast, the inner tube 27b of the coaxial tube conduit 27 is led further on, fluid-tight, through a corresponding orifice in the bowl bottom 26a and is led out of the header housing 5a downwardly. It forms, there, the inner tube of a second coaxial tube conduit 29, the outer tube of which issues, fluid-tight, into the bottom region of the header housing 5a below the header bowl 26.

In this way, the first coaxial tube conduit 27 forms the first internal heat exchanger portion 6a and the second coaxial tube conduit 29 the second internal heat exchanger 6b of FIG. 1. The low-pressure-side refrigerant 32 coming from the evaporator passes, via the outer annular duct of the first coaxial tube conduit 27, into the header bowl 26, from where, as indicated by the arrows, the collected refrigerant is sucked by the compressor suction action into the region between the header bowl 26 and the header housing 5a and from there into the header bottom region and the outer annular duct of the second coaxial tube conduit 29, in order, in said outer annular duct, to arrive directly or via the condenser/gas cooler at the compressor. The high-pressure-side refrigerant 31 coming from the condenser/gas cooler crosses the header 5 centrally in the inner tube 27b led through uninterruptedly and, at the same time, within the header housing 5a, is also in thermal contact, over the greatest part of the respective flow length, with the low-pressure-side refrigerant coming from the evaporator. Alternatively to the countercurrent routing shown, a cocurrent routing of the high-pressure-side refrigerant 31 and low-pressure-side refrigerant 32 is possible.

Figure 12:
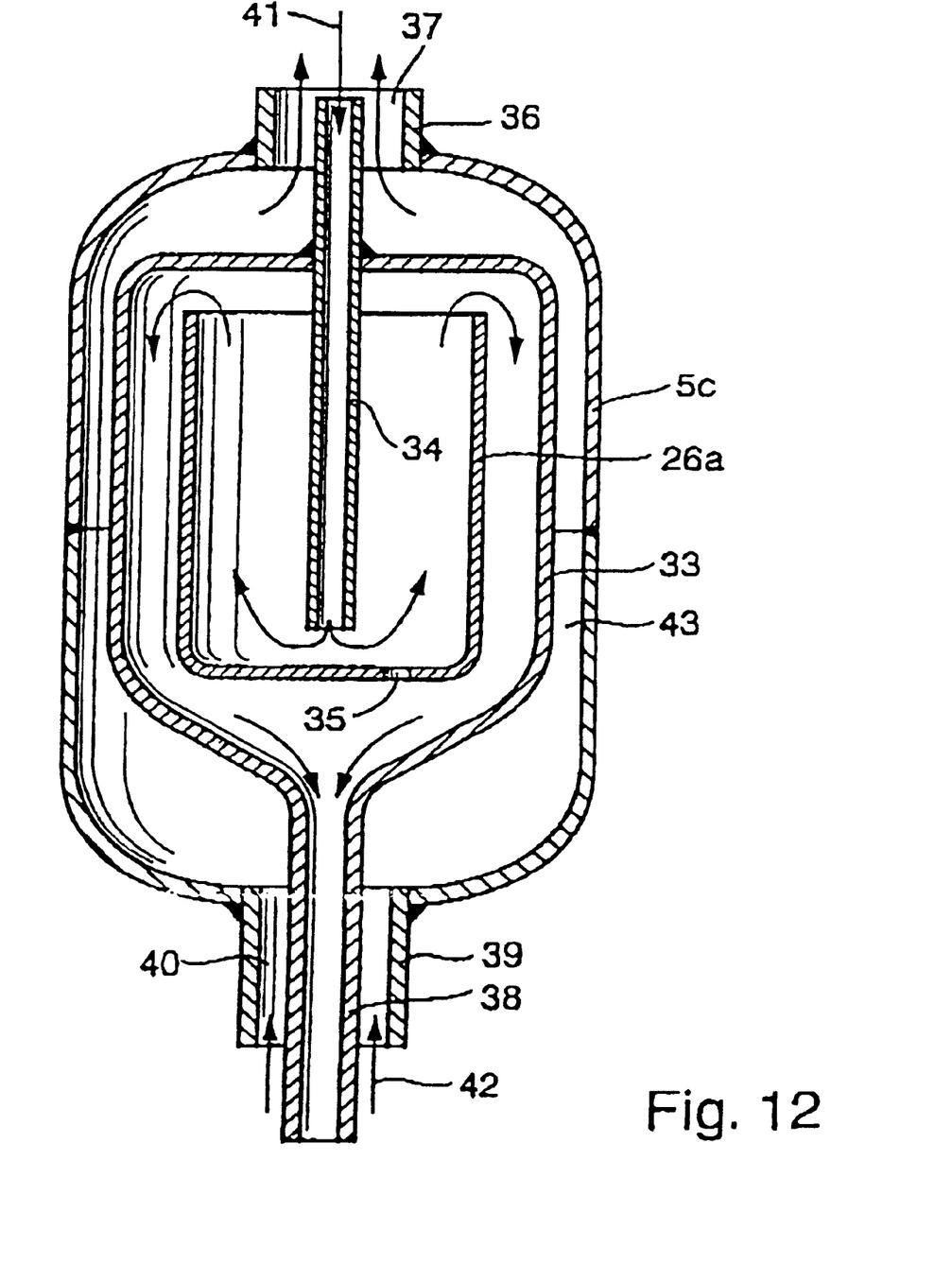
FIG. 12 shows a longitudinal sectional view corresponding to that of FIG. 11, but for a variant with a high-pressure leadthrough space in the header.

FIG. 12 shows a variant of the example of FIG. 11, in which an intermediate casing 33 is introduced between an outer header housing 5c and an inner heading bowl 26a. This intermediate casing closes off the header bowl 26a upwardly, with clearance, in a fluid-tight manner, a low-pressure inner tube 34 crossing this cover region of the intermediate casing 33 in a fluid-tight manner and terminating above the header bowl bottom, into which at least one oil suction-extraction bore 35 is introduced. The low-pressure inner tube 34 thus serves for feeding the low-pressure-side refrigerant 41 coming from the evaporator into the header bowl 26a. Said low-pressure inner tube is surrounded outwardly from the top side of the header housing 5c, so as to form a corresponding coaxial tube conduit 37, by an outer tube 36 which is connected, fluid-tight, to the top side of the header housing 5c and issues out there. The intermediate casing 33 narrows downwardly, in the form of a bottleneck, into a further outlet-side low-pressure inner tube 38.which emerges from the header housing 5c on the underside of the latter and is then surrounded by an associated outer tube 39, so as to form a further coaxial tube conduit 40, this outer tube 39 itself being secured, fluid-tight, to the bottom of the header housing 5c and issuing in there.

Consequently, in this exemplary embodiment, the first coaxial tube conduit 37 again forms the first internal heat exchanger portion and the other coaxial tube conduit 40 the second internal heat exchanger portion 6b of FIG. 1. In this case, at the same time, the low-pressure-side refrigerant 41 coming from the evaporator flows through the inner tube 34 of the associated coaxial tube conduit 37 into the header bowl 26a and from there is sucked, via the annular space between the header bowl 26a and the intermediate casing 33, out of the header housing 5c into the inner tube 38 of the other coaxial tube conduit 40, in order to arrive from there directly or via the condenser/gas cooler at the compressor. In countercurrent to this, the high-pressure-side refrigerant 42 passes, via the annular duct of the lower coaxial tube conduit 40 in FIG. 12, into a high-pressure leadthrough space 43 which is formed in the header by the header housing 5c as an outer boundary and by the intermediate casing 33 as an inner boundary. After crossing the high-pressure leadthrough space 43, the high-pressure-side refrigerant 42 leaves the header housing 5c upwardly via the annular duct of the coaxial tube conduit 37 following there. Consequently, via the intermediate casing 33, the high-pressure-side refrigerant is in thermal contact, even along its flow path through the high-pressure leadthrough space 43 of the header, with the low-pressure-side refrigerant 41.

Figure 13:
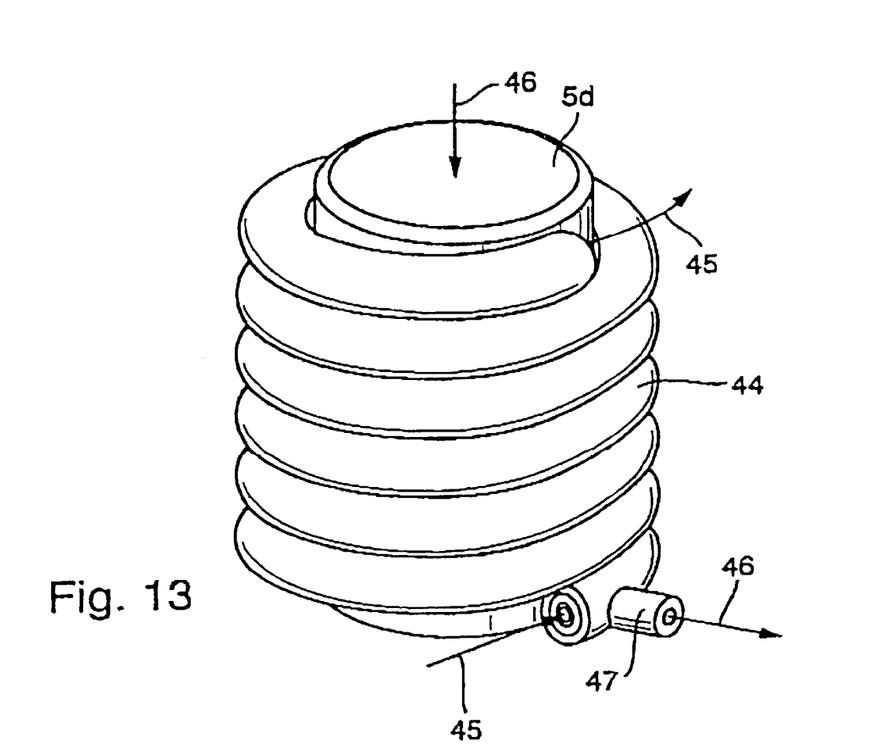
FIG. 13 shows a perspective view of a header with a helically surrounding coaxial tube conduit of an internal heat exchanger for an air-conditioning system in the manner of FIG. 1.

FIG. 13 shows an exemplary embodiment in which a helically wound coaxial tube conduit 44 serves as an internal heat exchanger. A header 5b of cylindrical form of construction is arranged in a space-saving way in the interior of the coaxial tube helix 44. High-pressure-side refrigerant 45 is fed, on end face of the coaxial tube helix 44, to the inner tube duct of the latter and leaves this correspondingly on the other end face of the coaxial tube helix 44. Low-pressure-side refrigerant 46 coming from the evaporator is fed to the header 5d from above. Under the suction action of the compressor, it is sucked from there, via a radial connection piece, not to be seen in FIG. 13, at the upper end of the coaxial tube helix 44, into the outer annular space of the latter. For this purpose, this connection piece makes a fluid connection between the upper header region and the outer annular space of the coaxial tube helix 44 in the latter's upper end region located there. After crossing the outer annular space of the coaxial tube helix 44, the refrigerant sucked out of the header 5d leaves the internal heat exchanger portion formed by the coaxial tube helix 44 via a further radial connection piece 47 which is formed on the lower end region of the coaxial tube helix 44 in fluid connection with the outer annular space of the latter. The outer annular space is closed on each end face. The coaxial tube helix 44 can thus serve as the second internal heat exchanger portion 6b of the air-conditioning system of FIG. 1.

Figure 14:
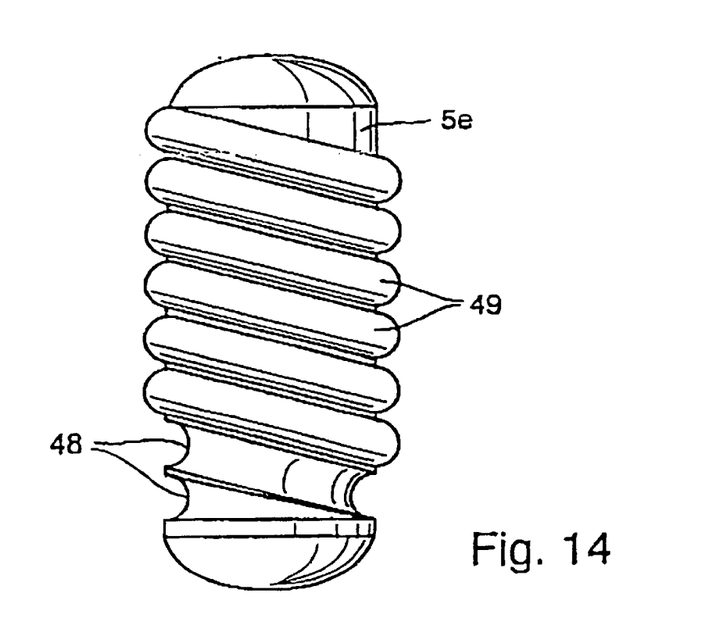
FIG. 14 shows a diagrammatic longitudinal sectional view of a variant of the combination of header and internal heat exchanger according to FIG. 13 with a screw-shaped header profile.

FIG. 14 shows diagrammatically a variant of the exemplary embodiment of FIG. 13. In this modification, a cylindrical header 5e is provided on the outside of its housing with a screw-shaped profiling 48 which serves as a guide groove for a conformally inserted coaxial tube helix 49 which, guided in this way, surrounds the outer casing of the header 5e. In this case, the lower part of the coaxial tube helix 49 is omitted in FIG. 14, so that the screw-shaped profiling 48 of the header 5e can be seen. This exemplary embodiment otherwise corresponds in set-up and functioning to that of FIG. 13.

The embodiments described above in detail show that the invention provides an air-conditioning system which has an efficiency-increasing internal heat exchanger and at the same time requires relatively little installation space by the internal heat exchanger being formed by a multiduct tube conduit, of which the low-pressure-side heat exchanger duct lies upstream and/or downstream of a header in the refrigerant flow direction and, if required, may also extend into the header, and/or by being formed by a coaxial tube conduit, which is coiled overall and/or has coiled webs or separating elements between the outer and the inner tube part, so that the flow path for the tube ducts located between the outer and the inner tube part is lengthened, as compared with the longitudinal extent of the coaxial tube. The invention can be applied, in particular, to $CO_2$ air-conditioning systems of motor vehicles. Since the header, on the one hand, and the internal heat exchanger, on the other hand, form separate components of the air-conditioning system according to the invention, both can be adapted independently of one another to the vehicle present in each case. The header can be designed with a comparatively small volume due to the presence of the internal heat exchanger. What is known as the bar/liter product can thereby be reduced, with the result that the stability of the header container under high pressures is improved.

What is claimed is:

1. An air-conditioning system for a motor vehicle comprising:
    a refrigerant circuit with a compressor for conveying a refrigerant from a low-pressure side to a high-pressure side;
    an evaporator;
    a header arranged on the low-pressure side between the evaporator and the compressor;
    an internal heat exchanger with a high-pressure-side heat exchanger duct; and
    a low-pressure-side heat exchanger duct which is in thermal contact with the high-pressure-side heat exchanger duct wherein the internal heat exchanger contains a coaxial tube conduit with an outer tube and an inner tube which has helical webs integrally formed on at least one of the inside of the outer tube and the outside of the inner tube, between the outer tube and the inner tube, one heat exchanger duct being formed by the interior of the inner tube and the other heat exchanger duct by the annular space between the outer tube and the inner tube,
    wherein the low-pressure-side heat exchanger duct forms a low-pressure-side refrigerant circuit portion between the header and at least one of the evaporator and the compressor and,
    wherein the internal heat exchanger contains a multiduct tube conduit, of which a low-pressure-side tube longitudinal duct has a first portion issuing into a header housing and a second portion issuing out of the header housing and a high-pressure-side tube longitudinal duct crosses the header housing continuously or issues with a first portion into a high-pressure leadthrough space formed within the header housing and issues with a second portion out of said high-pressure leadthrough space.

2. The air-conditioning system as claimed in claim 1, wherein the internal heat exchanger contains a multiduct tube conduit which surrounds the header helically on the outside.

3. The air-conditioning system as claimed in claim 1, wherein the coaxial tube conduit is designed at least in portions as a coaxial tube helix.

4. An air-conditioning system for a motor vehicle comprising:
    a refrigerant circuit with a compressor for conveying a refrigerant from a low-pressure side to a high-pressure side;
    an evaporator;
    a header arranged on the low-pressure side between the evaporator and the compressor;
    an internal heat exchanger with a high-pressure-side heat exchanger duct; and
    a low-pressure-side heat exchanger duct which is in thermal contact with the high-pressure-side heat exchanger duct wherein the internal heat exchanger contains a coaxial tube conduit with an outer tube and an inner tube which has helical webs integrally formed on at least one of the inside of the outer tube and the outside of the inner tube, between the outer tube and the inner tube, one heat exchanger duct being formed by the interior of the inner tube and the other heat exchanger duct by the annular space between the outer tube and the inner tube,
    wherein the low-pressure-side heat exchanger duct forms a low-pressure-side refrigerant circuit portion between the header and at least one of the evaporator and the compressor,
    wherein the coaxial tube conduit is formed by one of:
        by the outer tube and an extruded inner tube with outer webs, which is pushed into said outer tube, by an extruded outer tube with inner webs, with a pushed-in inner tube, and
        by a coaxial tube extruded in one piece and having webs between the inner tube and the outer tube and,
    wherein the internal heat exchanger contains a multiduct tube conduit, of which a low-pressure-side tube longitudinal duct has a first portion issuing into a header housing and a second portion issuing out of the header housing and a high-pressure-side tube longitudinal duct crosses the header housing continuously or issues with a first portion into a high-pressure leadthrough space formed within the header housing and issues with a second portion out of said high-pressure leadthrough space.

5. The air-conditioning system as claimed in claim 4, wherein the internal heat exchanger contains a multiduct tube conduit which surrounds the header helically on the outside.

6. The air-conditioning system as claimed in claim 4, wherein the coaxial tube conduit is designed at least in portions as a coaxial tube helix.

* * * * *